United States Patent [19]

Mertens et al.

[11] Patent Number: 4,914,355
[45] Date of Patent: Apr. 3, 1990

[54] D.C. VOLTAGE SUPPLY CIRCUIT FOR FLUORESCENT LAMPS

[75] Inventors: Ferdinand Mertens; Fred Hasemann; Norbert Wittig, all of Arnsberg, Fed. Rep. of Germany

[73] Assignee: Trilux-Lenze GmbH & Co. KG, Arnsberg, Fed. Rep. of Germany

[21] Appl. No.: 158,284

[22] Filed: Feb. 18, 1988

[30] Foreign Application Priority Data

Nov. 15, 1986 [DE] Fed. Rep. of Germany ....... 3639116
Sep. 25, 1987 [EP] European Pat. Off. ........... 87114018

[51] Int. Cl.$^4$ ........................................... H05B 37/02
[52] U.S. Cl. .................................... 315/307; 315/224; 315/225; 315/127; 363/50; 363/55; 363/56
[58] Field of Search ............... 315/307, 224, 225, 127; 363/50, 56, 56

[56] References Cited

U.S. PATENT DOCUMENTS 4,330,816  5/1982  Imazeki et al. ...................... 363/56

FOREIGN PATENT DOCUMENTS

3025405A1  1/1982  Fed. Rep. of Germany .
3517297C1  7/1986  Fed. Rep. of Germany .

Primary Examiner—Eugene R. LaRoche
Assistant Examiner—Truc Nguyen
Attorney, Agent, or Firm—Spensley Horn Jubas & Lubitz

[57] ABSTRACT

A d.c. voltage supply circuit including a flyback converter having an inductor which is alternatingly charged through an electronic switch and discharged via a diode onto a capacitor. The output voltage of the flyback converter is continuously monitored. If a threshold value is exceeded, the electronic switch, which is mounted in an input line of the flyback converter, is changed into the off-state. The off-state of the electronic switch is terminated as soon as the output voltage has again fallen below the threshold value. Loads requiring a specific d.c. voltage may be connected to different supply voltages without the need of changeovers. The circuit offers a high security in view of overvoltage from the power network. It is self-monitoring and protects the connected load.

8 Claims, 5 Drawing Sheets

D.C. VOLTAGE SUPPLY CIRCUIT FOR FLUORESCENT LAMPS

BACKGROUND OF THE INVENTION

1. Field of the Invention

The invention relates to a d.c. voltage supply circuit for fluorescent lamps.

2. Description of Related Art

Since electronic ballasts for fluorescent lamps require a d.c. voltage supply, the available a.c. line voltage is converted into a constant d.c. voltage. In the case of rectifying circuits, energy may be only drawn from the power network if the input line voltage is higher than the output voltage. Resultant short-time current peaks bring about an inadmissible load of the power network. To comply with the respective rules, it is customary to series-connect a filter arrangement of inductivity and capacity.

Said filter arrangement is a low-pass having a limiting frequency corresponding to the network frequency. The latter being relatively low, it is necessary for the choke to have a high inductivity, thus implying, with a corresponding power consumption of the load, a big-sized choke having a high percentage of iron, large dimensions and a high weight.

To avoid using a low-pass filter with an expensive choke, it has been known to arrange in a d.c. supply circuit for fluorescent lamps a flyback converter (DE-OS 30 25 405) having a coil of a relatively low inductivity which, by a switch, is periodically connected to the output of a rectifying circuit and which, via a rectifier, is subsequently discharged onto a capacitor. In the conductive phase of the switch, the inductivity is charged and, in the off-phase of the switch, the inductivity is discharged onto the capacitor with a resultant rise of the voltage at the capacitor, i.e. of the output voltage of the flyback converter. On the other hand, the capacitor voltage is continuously discharged by the load. The frequency at which the switch is changed over is much higher than the network frequency so that the envelope of the needle-type charging current pulses has a time curve following the sinusoidal shape of the rectified line voltage. To avoid that, by the needle-shaped current pulses, high-frequency disturbances get into the supply line, it is necessary to use a relatively simple filter circuit having a low inductivy.

In case of the known d.c. voltage supply circuit, the flyback converter is an up-chopper-circuit with the inductivity in an input line, while the switch is arranged in a transverse branch between input lines. Inductivity is connected via the diode to an output line of the flyback converter. In case of a high current requirement of the load, said current may flow directly from the rectifying circuit through the series arrangement of inductivity and diode. On the other hand, there is the risk that, through said series connection, overvoltages of the supply line directly breakdown to the load and affect its constructional elements. Such overvoltages may consist of short-term voltage peaks or they may be also caused by faulty switching. An excessively high voltage to which the supply circuit may be connected, will be effective as far as to the load. Another disadvantage of the known flyback converter resides in the fact that the frequency for controlling the switch to recharge inductivity is dependent on the variation in time of the discharging current, which, on its turn, is dependent upon the difference between the output voltage and the input voltage of the flyback converter. To avoid losses, the switch should be changed to the conductive state, if the value of the discharge current of the inductivity has reached zero. The time required to this effect, is dictated by the difference between the output and input voltage. In case of a constant output voltage, said difference varies responsive to the variation in time of the input voltage which is a rectified alternating voltage.

It is the object of an invention to provide a d.c. voltage supply circuit which is applicable to a wide range of input voltages and by which the connected load, namely the fluorescent lamp choke, is protected against overvoltages.

Summary of the Invention

According to the invention, the input line of the flyback converter includes an electronic switch being controlled responsive to the output voltage of the flyback converter and being set into the off-state when the output voltage exceeds a predetermined threshold value. In other words, the flyback converter is disconnected as long as its output voltage being supplied as input voltage to the connected load is too high. The switch serving as a voltage limiter does not only protect the device which is disconnected in case of an overvoltage, but it also complies with a control duty because it is automatically reset into the conductive state when the output voltage of the flyback converter has decayed to beneath the threshold value. The flyback converter is only disconnected temporarily in case of an overvoltage. If said overvoltage is a short-term interference pulse, it is, in a way, filtered out. However, if overvoltage results from an excessive line voltage, the switch causes a permanent disconnection until the values of the line voltage are admissible again.

Further, d.c. voltage as well as a.c. voltage may be used for the operation.

In a preferred embodiment of the flyback converter the switch controlling the charging and discharging of inductivity is provided in an input line. Said switch is used additionally for controlling the output voltage of the flyback converter thus allowing to realise two different functions with the same switch, namely controlling recharging and discharging of inductivity, and, additionally, regulating the output voltage of the flyback converter. In other words, one sole electronic switch is required only which connects the capacitor of the flyback converter to one pole of the supply voltage. If said switch is in off-state, the connection between load and supply voltage is completely interrupted thus allowing to exclusively apply to the load the energy stored in the capacitor and in the inductivity of the flyback converter.

In addition to, or instead of the control of the output voltage, the switch provided for the voltage limitation may assume further limiting functions namely a limitation of the input current drawn by the flyback converter and a limitation of the input voltage of the flyback converter. The limiting functions are kind of an OR-operation, i.e. if one of the measured values exceeds its appertaining threshold, the switch interrupts one of the lines through which the flyback converter is connected to the line voltage.

Brief Description of the Drawings

Some embodiments of the invention will be explained hereunder in more detail with reference to the drawings in which.

Description of the Preferred Embodiment

Figure 1:
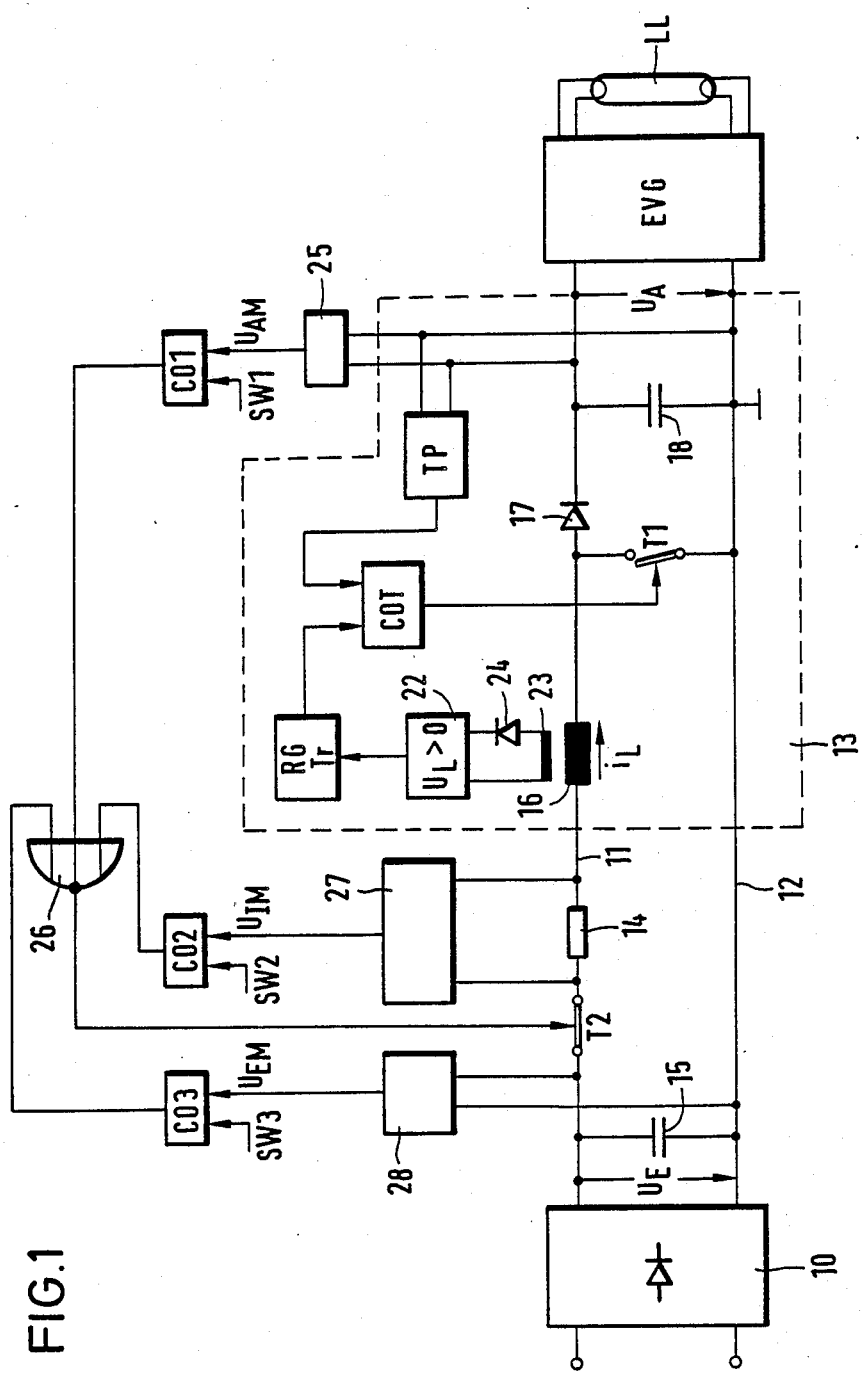
FIG. 1 is a block wiring diagram of a first embodiment in which the flyback converter is an up-chopper-circuit.

FIG. 1 shows a rectifying circuit 10 designed as a double-way rectifier and whose input is connected via a (non-illustrated) high frequency filter to the line voltage of e.g. 220 V and 50 Hz. At the output of the rectifying circuit 10, there is formed a rectified a.c. voltage which will be referred to as hereinafter as input voltage $U_E$ generated between the two input lines 11 and 12 of the flyback converter 13. One input line 11 contains a series connection comprising an electronic switch T2, e.g. a transistor, and a low-ohmic current measuring resistor 14. The input line 12 of the flyback converter 13 is connected to the ground potential. Between output lines of the rectifying circuit 10, there is connected a capacitor 15.

At the output of flyback converter 13, there is produced, in a manner still to be explained, the output voltage $U_A$ which is a d.c. voltage by which the electronic ballast EVG of a fluorescent lamp LL is powered. The electronic ballast EVG may be of a similar design as the unit disclosed in German Patent 35 17 297 providing the control of the lamp current by means of a switch regulator. However, it is also possible to use ballasts containing an inverted rectifier and a connected oscillation circuit for powering the lamps. The electronic ballast EVG is only a load which is powered by a d.c. voltage of a specific value.

Through the series connection which contains inductivity 16 and diode 17 poled in conducting direction, the input line 11 of the flyback converter 13 is connected to one pole of ballast EVG, while input line 12 is connected directly to the other pole of the ballast EVG. Via electronic switch T1, the junction point between inductivity 16 and diode 17 is connected to input line 12. For simplification's sake, the electronic switches T1 and T2 are illustrated as mechanical elements. Preferably, use is made of transistors.

The cathode of diode 17 is connected to a capacitor 18 whose other terminal is connected to a ground potential. The output voltage $U_A$ is produced at capacitor 18.

Figure 2:
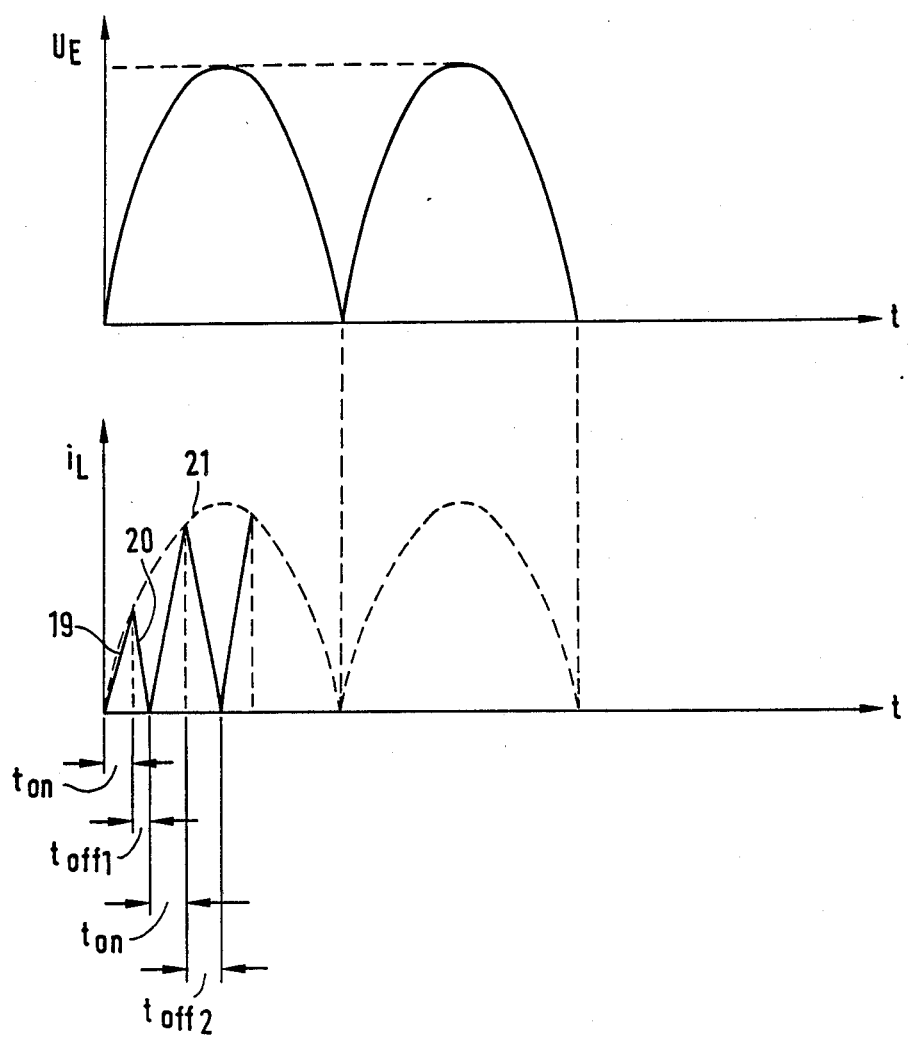
FIG. 2 shows the variations in time of the input voltage and of the coil current in case of the flyback converter of FIG. 1.

During each semi-period of the input voltage $U_E$, the switch T1 is repeatedly operated to alternatingly take the conductive or off-state. FIG. 2 shows the variation in time of the input voltage $U_E$ which is a rectified a.c. voltage. Further, FIG. 2 also illustrates the variation in time of the coil current $i_L$. For a better survey, only a few current pulses are shown within a semiwave of the input voltage $U_E$. In practice, the frequency of pulses of the coil current $i_L$ is substantially higher so that, within one semiwave of the input voltage, the number of triangular pulses of the coil current $i_L$ is high.

As evident from FIG. 2, during the on-time $t_{on}$, in which switch T1 is conductive, a linearly rising edge 19 of the coil current is formed while in the subsequent off-time $t_{off}$, there is formed a linearly trailing edge 20 in which the coil current decreases to zero. The pulse height is dictated by voltage $U_E$ at the moment of the respective pulse. Therefore, the envelope 21 of the current pulses is proportional to the variation in time of voltage $U_E$.

On-times $t_{on}$ are determined by the height of the output voltage $U_A$ which is supplied to a low-pass filter TP supplying a signal corresponding to the output voltage to the one input of a comparator COT. To the other input of comparator COT, there is supplied the ramp signal ascendent linearly in time of a ramp generator RG. If said signal of the ramp generator RG reaches the height of the output signal of the low-pass filter TP, switch T1 is set into the non-conductive (off)state by comparator COT. By a trigger signal Tr at its trigger input, ramp generator RG becomes operative whereby generation of the linearly ascendent voltage signal is initiated. The trigger signal Tr is produced by a detector circuit 22 connected via a diode 24 with a secondary coil 23 of inductivity 16. Whenever the discharging current of inductivity 16 takes the value zero, the trigger signal Tr is produced. From said moment, switch T1 is kept in the conductive state until the signal of the ramp generator RG has reached the amplitude of the output signal of the low-pass TP. Together with comparator COT, the ramp generator RG forms a timer which, responsive to the output voltage $U_A$, determines the duration of the on-time $t_{on}$. The time constant of low-pass TP corresponds at least to the time of a semi-period of the input voltage $U_E$ thus allowing to assume that the duration of the on-time $t_{on}$ within a semiperiod is constant. In other words, said on-time does not change in case of short-time changes of the output voltage $U_A$.

Figure 3:
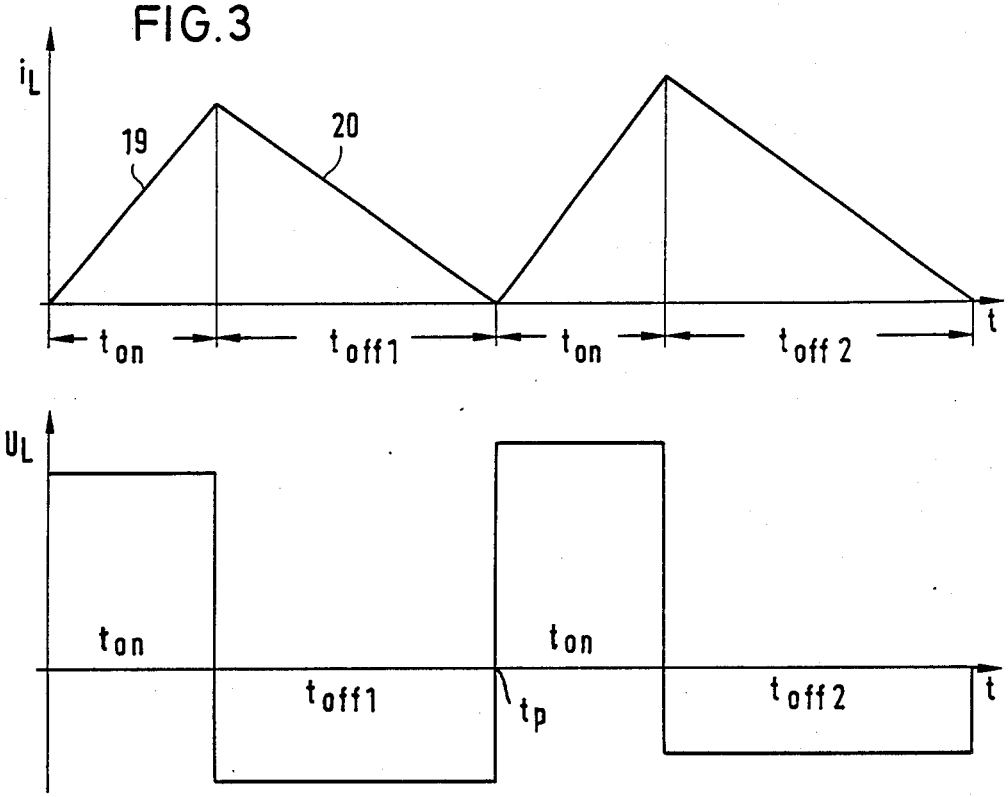
FIG. 3 shows, in a changed time scale, the variations in time of the coil current and of the coil voltage.

On the other hand, duration changes as to the off-time $t_{off}$ required in case of a non-conductive switch T1 in order to discharge the coil 16 via diode 17 onto the capacitor 18. Duration of the discharge current corresponding to the trailing edge 20 of the current pulse (FIG. 2 and 3) depends upon the size of the instantaneous amplitude of the input voltage $U_E$. In case of two successive current pulses during the ascendent curve of the input voltage $U_E$, the off-time $t_{off2}$ of the subsequent current pulse is greater than the off-time $t_{off1}$ of the preceding current pulse due to the fact that the maximum values of current $i_L$ vary.

During the on-times $t_{on}$, voltage $U_L$ of inductivity 16 is positive, the amplitude being also dependent upon the instantaneous amplitude of the input voltage $U_E$. If switch T1 is rendered non-conductive (during the off-times $t_{off}$), polarity of voltage $U_L$ is reversed, the amplitude of the resultant negative voltage pulses also being dependent upon the instantaneous amplitude of the input voltage. If the current pulse is terminated at moment $t_p$, and if the amplitude of voltage $U_L$, becomes zero while it was negative before, this will be detected by the voltage detector 22 which will generate the trigger signal Tr to initate the next current pulse.

The output voltage $U_A$ of the flyback converter 13 is supplied to a voltage converter 25 generating a measuring signal $U_{AM}$ proportional to the output voltage and being supplied to the input of the comparator C01. The other input of said comparator C01 receives a threshold signal SW1 which, for instance, is set at a potentiometer. The comparator C01 produces an output signal if the measuring signal $U_{AM}$ exceeds the height of the threshold signal SW1. Said output signal is applied to an input of an NOR gate 26 whose output controls the electronic switch T2. When one of the inputs of the NOR gate 26 receives the "1"-signal, the output signal of said gate becomes "0", thus setting switch T2 into the non-conductive state. Only in case that all inputs of the NOR-gate 26 receive the "0"-signal, the output of said gate generates a "1"-signal thus keeping switch T2 conductive.

Due to the coil current $i_L$, there is produced at the measuring resistor 14 a voltage drop which, by converter 27, is converted into a current measuring signal $U_{IM}$ being supplied to one input of a comparator C02. Its other input receives a preset threshold signal SW2. If measuring signal $U_{IM}$ exceeds value SW2, comparator C02 produces an output signal which is fed to another input of the NOR-gate 26.

Voltage $U_E$ is fed to a voltage converter 28 feeding to comparator C03 a measuring signal $U_{EM}$ corresponding to said voltage. The other input of the cmparator C03 receives a preset threshold signal SW3. Comparator C03 generates an output signal if the measuring signal $U_{EM}$ exceeds the threshold value SW3. This output signal is fed to a third input of the NOR-gate 26.

If the flyback converter is operated, switch T2 is normaly conductive, while switch T1, as disclosed above, is frequently changed over during each semiperiod of the input voltage $U_E$ in order to generate the output voltage UA at the capacitor 18.

If the supply voltage to which the device is connected, is too high, or if, through the supply voltage, a short-time high voltage pulse is fed to the device, this is detected by comparator C03 whereupon through NOR-gate 26, switch T2 provided in the input line 11 is immediately directed into the off (non-conductive)-state, with the resultant disconnection of the flyback converter 13 until voltage $U_E$ has decayed again to beneath the threshold value preset by the SW3. Switch T2 is turned off in the same way when the coil current $i_L$ exceeds a predetermined value or when the output voltage $U_A$ exceeds a predetermined threshold value.

Figure 4:
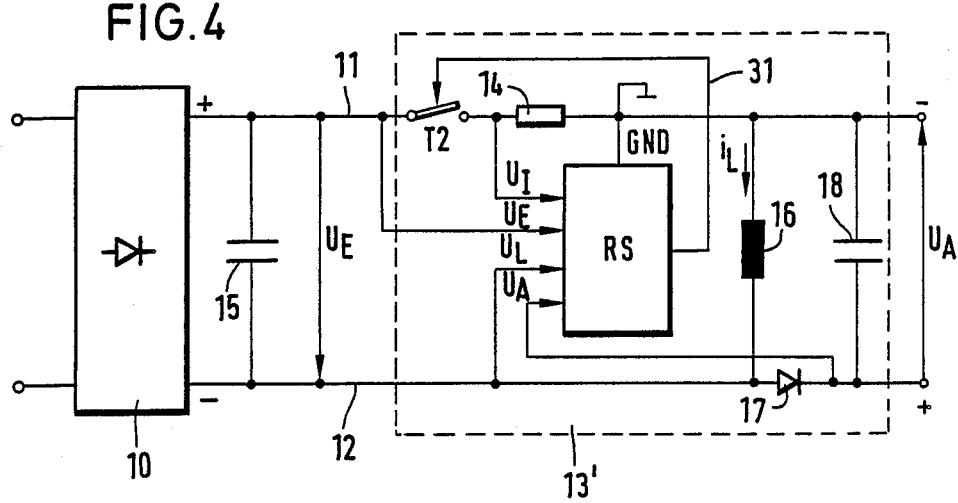
FIG. 4 is a block wiring diagram of a flyback converter designed as a switching regulator with voltage reversal.

FIG. 4 shows an embodiment in which the flyback converter 13' is a switch regulator with voltage reversal. In other words, the output voltage $U_A$ has a polarity reversed with respect to the input voltage $U_E$. Through a series connection of electronic switch T2 and measuring resistor 14, there is connected to the input line 11 one pole of capacitor 18 at which the output voltage $U_A$ is formed. The other pole of capacitor 18 is connected to the cathode of diode 17 whose anode is connected to the input line 12. One end of the inductivity (coil) 16 is connected to the minus pole of the output voltage $U_A$, said end being connected to a ground potential while the other end of the inductivity is joined to the anode of diode 17.

If the switch T2 is conductive, inductivity 16 is charged by the rectifier 10 through the measuring resistor 14, with a resultant linear rise of the coil current $i_L$.

If the switch T2 is nonconductive, inductivity 16 tries to maintain the coil current. This being only possible by a current flowing through the series connection including capacitor 18 and diode 17, the coil current flows to the capacitor 18 which is . charged accordingly.

The flyback converter 13' contains a regulating circuit RS connected with the ground potential as reference potential. The following potentials are supplied to the regulating circuit RS: the current-dependent voltage $U_I$, at the measuring resistor 14, the input voltage $U_E$ of the input line 11, the coil voltage $U_L$ of the input line 12, connected to one end of coil 16, and the output voltage $U_A$ at the junction point between capacitor 18 and diode 17. All of said potentials are representative of voltages with respect to ground potential thus allowing to directly feed potentials to the regulating circuit RS without interconnecting potential-separating elements such as optocouplers etc.

Figure 5:
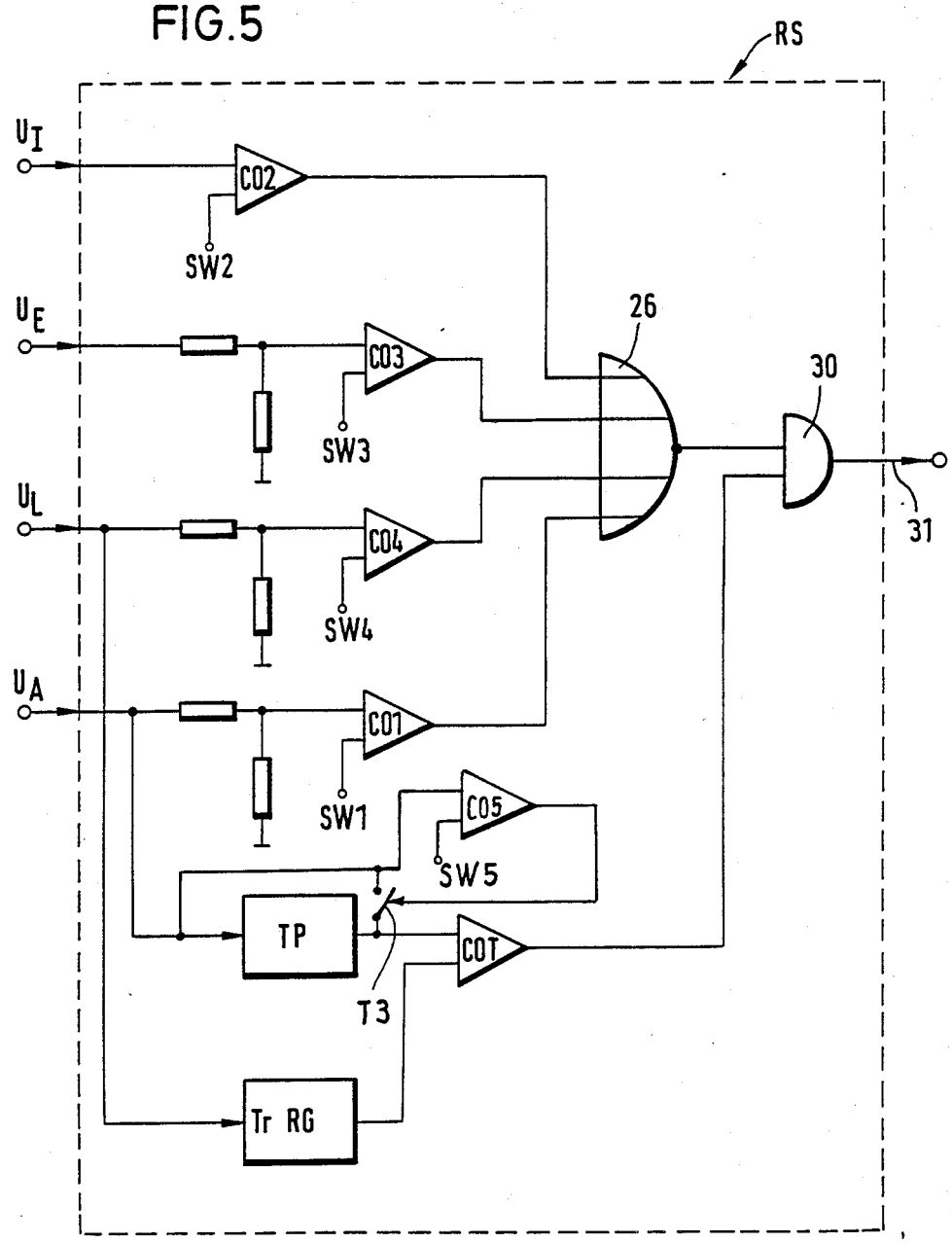
FIG. 5 is a wiring diagram of the control circuit of the flyback converter of FIG. 4

The regulating circuit RS shown in FIG. 5 controls switch T2 and comprises a ramp generator RG which is triggered by coil voltage $U_L$ if, after a pulse, the coil current has dropped to zero. The ramp generator RG then produces a linearly ascendent ramp voltage which is fed to comparator COT whose other input is provided, via low-pass TP, with output voltage $U_A$ From the moment of the trigger signal, comparator COT generates an output signal "1" until the signal of the ramp generator RG has reached the height of the output signal of the low-pass TP, said output signal being fed via an AND-gate 30 to the control line 31 for switch T2. If the signal at control line 31 is "1", switch T2 is rendered conductive. If the signal at the control line 31 is "0", switch T2 is rendered nonconductive.

The output signal of the NOR-gate 26 is fed to the second input of the AND-gate 30. Said output signal is only "1", if all input signals of the NOR-gate are "0".

To one input of the NOR-gate 26, there is fed the output signal of a comparator C01 which receives at one input the output voltage $U_A$ and at its reference input a threshold value SW1. The output of the comparator C01 supplies "1"-signals when $U_A$ exceeds SW1.

Another input of the NOR-gate 26 receives the output signal of the comparator C02, which, at one input, receives voltage $U_I$ corresponding to the coil current, and at its second input the threshold value SW2 as a reference signal. The comparator C02 supplies an output signal "1" when $U_I$ exceeds SW2.

Another input of the NOR-gate 26 is connected to the output of comparator C03 which, at one input, receives the input voltage $U_E$ and at its reference input the threshold value SW3. Comparator C03 supplies an output signal "1", when $U_E$ exceeds SW3.

A fourth input of the NOR-gate 26 is connected to the output of comparator C04, which, at one input, receives the coil voltage $U_L$ and at its reference input threshold value SW4. Comparator C04 supplies an output signal "1", when $U_L$ is higher than SW4.

If one of the signals $U_I$, $U_E$, $U_L$ or $U_A$ exceeds the associated threshold value, switch T2 is compulsorily set into the nonconductive state or left in it, regardless of the respective output signal of comparator COT. By this means, voltages or currents which are too high at any points of the flyback converter 13' cause an off-state of T2 which is terminated when the monitored value has decreased again to beneath its threshold value.

Should the output voltage $U_A$ be inferior to a predetermined threshold value SW5, or in case of a quick change of $U_A$ towards lower values, the low-pass filter TP is bridged to thus obtain a quicker regulation of the output voltage $U_A$, the desired value being reached again within short. If the trouble is eliminated, the low-pass filter TP is automatically reconnected in that switch T3 is set to become nonconductive. Bridging of the low-pass filter is particularly important for the on-operation of the fluorescent lamp because a high load jump at the output occurs with the ignition of the fluorescent lamp, whereby the load voltage $U_A$ decreases. Due to the bridging of the low-pass filter, $U_A$ reaches again more quickly the desired value. Switch T3 is controlled by the output signal of a comparator C05 receiving at its one input voltage $U_A$ and at its other input threshold value SW5. Due to the comparator C05, switch T3 becomes conductive if $U_A$ is inferior to the threshold value SW5.

Figure 6:
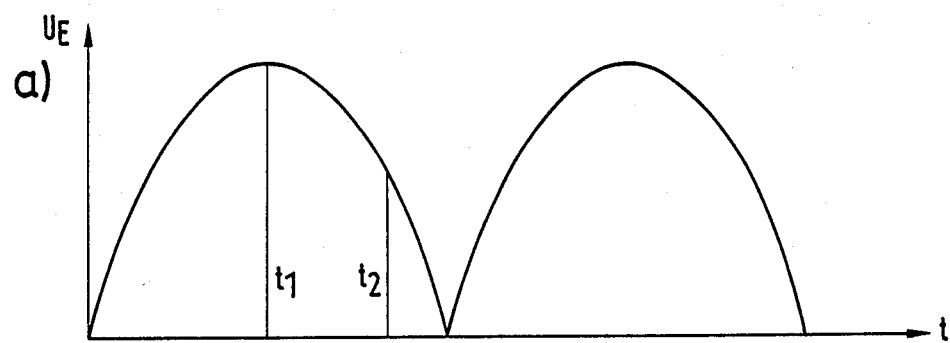
FIG. 6 shows different variations in time of the coil current responsive to the amplitude of the supply voltage in case of the embodiments of FIGS. 1 and 4.
Figure 6:
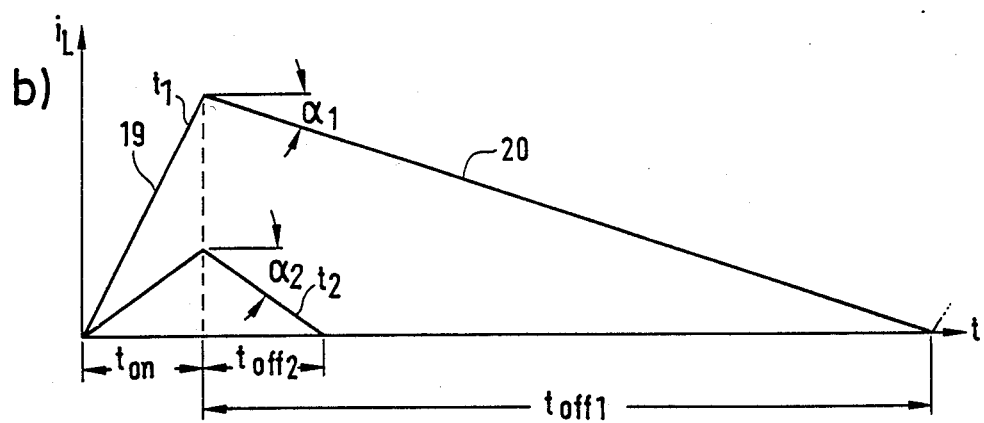
Figure 6:
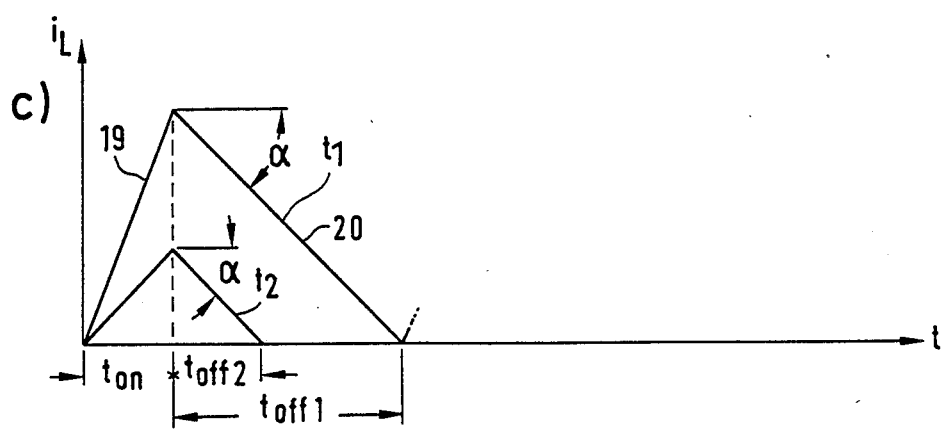

Based on FIG. 6, a substantial advantage of the embodiment of FIG. 4 and 5 as compared to that of FIG. 1 will be now explained hereinafter.

First off, frequency f of the pulses of the coil current should be as high as possible to ensure that, with the same efficiency of the load, the peak current may be as low as possible by the series connection. A low peak current allows to provide a small-sized inductivity.

FIG. 6a shows the variation in time of the input voltage $U_E$ of the flyback converter 13 or 13'. In this connection, one should look at the current pulses at moments $t_1$ and $t_2$.

FIG. 6b shows the coil current $i_L$ during a current pulse in case of an up-chopper-circuit of FIG. 1. In case of the current pulse generated at the moment $t_1$, i.e. at a high input voltage, the duration $t_{on}$ of the leading edge 19 is the same as with the current pulse generated at the moment $t_2$, namely with a low amplitude of the input voltage. The maximum values of the current pulses are distinctive in accordance with the amplitude ratio of the input voltages. The respective times $t_{off1}$ and $t_{off2}$ of the trailing edges 20 in both cases are different due to the fact that the slope angle is, in case of the embodiment of FIG. 1, $$\alpha = \arctan \frac{U_A - U_E}{L}$$

wherein L refers to the inductivity of the coil. Sine $U_A$ may be regarded as a constant factor, the slope of the trailing edge 20 depends upon the value of $U_E$ with resultant different slope angles $\alpha_1$ and $\alpha_2$ at the moments $t_1$ and $t_2$. The off-times $t_{off}$ do not only vary proportionally to $U_E$, but they also are extended overproportionally whereby the frequency of the current pulses is subjected to high fluctuations during each semiperiod of $U_E$.

FIG. 6c shows the same conditions in case of the flyback converter of FIG. 4 in which, during the off-times $t_{off}$ of T2, inductivity is parallel to the output voltage $U_A$. In this case, the slope angle of the trailing edge 20 during the off-times is $$\alpha = \arctan \frac{U_A}{L}.$$

In view of the constant output voltage $U_A$, said value is also constant. The trailing edges 20 thus have the same slope $\alpha$ at both times $t_1$ and $t_2$. While, also according to FIG. 6c, frequency of the current pulses varies subject to the amplitude of the input voltage $U_E$, the frequency changes are smaller and, in particular, the mean frequency of the pulses is higher than that of the first embodiment. As a result, a smaller-sized coil can be used.

Moreover, in case of the second embodiment, on-time $t_{on}$ is shorter than for the first embodiment.

What is claimed is:

1. A voltage supply circuit for a fluorescent lamp, said voltage supply circuit comprising:
   a flyback converter having an input and an output for converting a supply voltage to a d.c. voltage of constant amplitude, the flyback converter including an inductor connected to the supply voltage and charging means for enabling intermitent charging of the inductor,
   switching means provided between the supply voltage and the input of the flyback converter, the switching means being alterable between a conductive state in which the supply voltage is connected to the input of the flyback converter and a nonconductive state in which the supply voltage is not connected to the input of the flyback converter,
   output voltage sensor means for sensing an output voltage of the flyback converter in excess of a predetermined output voltage threshold value and for altering the switching means to the nonconductive state in response to sensing an output voltage of the flyback converter in excess of the predetermined output voltage threshold value,
   whereby the supply voltage is not connected to the output of the flyback converter when the output voltage exceeds the predetermined output voltage threshold value.

2. A voltage supply circuit as defined in claim 1, further comprising:
   inductor current sensor means for sensing current in the inductor and for altering the switching means to the conductive state in response to sensing current in the inductor,
   whereby the supply voltage is not connected to the input of the flyback converter when the output voltage exceeds the predetermined output voltage threshold value and
   whereby the supply voltage is connected to the input of the flyback converter when the output voltage does not exceed the predetermined output voltage threshold value.

3. A voltage supply circuit as defined in claim 1, further comprising:
   input current sensor means for sensing current in the input of the flyback converter in excess of a predetermined input current threshold value and for altering the switching means to the nonconductive state in response to sensing current in the input of the flyback converter in excess of the predetermined input current threshold value,
   whereby the supply voltage is not connected to the input of the flyback converter when the current in the input of the flyback converter exceeds the predetermined input current threshold value.

4. A voltage supply circuit as defined in claim 1, further comprising:
   input voltage sensor means for sensing voltage in the input of the flyback converter in excess of a predetermined input voltage threshold value and for altering the switching means to the nonconductive state in response to sensing voltage in the input of the flyback converter in excess of the predetermined voltage current threshold value,
   whereby the supply voltage is not connected to the input of the flyback converter when the voltage in the input of the flyback converter exceeds the predetermined input voltage threshold value.

5. A voltage supply circuit as defined in claim 1 wherein the flyback converter further comprises:
- a control circuit for altering the switching means between the conductive state and the nonconductive state to thereby charge and discharge the inductor if the inductor voltage or the inductor current becomes zero at the end of the nonconductive state,
- timing means, responsive to the output voltage of the flyback converter, for determining the duration of the conductive state of the switching means.

6. A voltage supply circuit as defined in claim 5 wherein the supply voltage input to the flyback converter is a.c. voltage, further comprising:
- a low pass filter having a time constant substantially corresponding to a semiperiod of the supply voltage, and
- feed means for feeding the output voltage of the flyback converter through the low-pass filter to the timer.

7. A voltage supply circuit as defined in claim 6, further comprising:
- second output voltage sensor means for sensing an output voltage of the flyback converter below a second predetermined output voltage threshold value and for bridging the low pass filter in response to sensing an output voltage of the flyback converter below the second predetermined output voltage threshold value.

8. A voltage supply circuit as defined in claim 1, wherein the flyback converter further comprises:
- a diode connected with the inductor and a capacitor connected in parallel with the inductor, the inductor having a first end which is connected to a terminal of the diode and a second end which is connected to a terminal of the capacitor, the second end of the inductor defining a reference potential with respect to which all other potentials are measured.

* * * * *